United States Patent [19]
Malagrino, Jr. et al.

[11] Patent Number: 5,292,222
[45] Date of Patent: Mar. 8, 1994

[54] ROBOTIC LOAD DEVICE FOR OUTER DIAMETER PICKUP OF A DISK

[75] Inventors: Gerald D. Malagrino, Jr., Rochester; Lawrence M. Prenzlow, Kasson, both of Minn.

[73] Assignee: International Business Machines Corporation, Armonk, N.Y.

[21] Appl. No.: 860,929

[22] Filed: Mar. 31, 1992

[51] Int. Cl.⁵ .................................. B25J 15/06
[52] U.S. Cl. ........................ 414/786; 294/64.1; 901/40
[58] Field of Search ......... 414/752, 736, 737, DIG. 7, 414/786; 901/40; 294/64.1, 1.1

[56] References Cited

U.S. PATENT DOCUMENTS

| | | |
|---|---|---|
| 4,496,180 | 1/1985 | Hillman et al. ............... 294/64 R |
| 4,515,508 | 5/1985 | Takamatsu ................ 294/64.1 X |
| 4,720,130 | 1/1988 | Andou ........................... 294/64.1 |
| 4,773,687 | 9/1988 | Bush et al. .................... 294/64.1 |
| 4,775,281 | 10/1988 | Prentakis ........................ 414/416 |
| 4,886,412 | 12/1989 | Wooding et al. ............. 414/416 |
| 4,902,186 | 2/1990 | Akagawa ....................... 414/417 |
| 4,983,093 | 1/1991 | Foulke et al. ................. 414/416 |
| 5,142,766 | 9/1992 | Wehrmeister .............. 414/736 X |

*Primary Examiner*—Michael S. Huppert
*Assistant Examiner*—Donald W. Underwood
*Attorney, Agent, or Firm*—Hugh D. Jaeger

[57] ABSTRACT

A robotic load device gripper for picking up an edge of a disk, and more particularly, pertains to a robotic load device for outer diameter pickup of a disk, either selected or randomly selected, such as at quarter inch spacings, from cassettes, containers, or in groups of disks for predetermined placement.

3 Claims, 3 Drawing Sheets

FIG. I

ROBOTIC LOAD DEVICE FOR OUTER DIAMETER PICKUP OF A DISK

BACKGROUND OF THE INVENTION

1. Technical Field—Field of the Invention

The present invention relates to a robotic load device gripper for picking up an edge of a disk, and more particularly, pertains to a robotic load device for outer diameter pickup of a disk, either selected or randomly selected, such as at quarter inch spacings, from cassettes, containers, or in groups of disks for predetermined placement.

2. Background Art—Description of the Prior Art

Prior art pickup of disks has been by either lobster claw devices with two moving joints to grip the outer diameter edges of a disk, or by a ring device to create a vacuum on the inner diameter of the disk for pickup.

These prior art devices allow construction of the disks by surface contact between the device and the disk, and by moving ports.

The present invention overcomes the disadvantages of the prior art by providing a robotic load device for engaging the outer rim of the disk for pickup and placement to minimize particle generation by assuring the disk surface is not touched.

DISCLOSURE OF THE INVENTION—SUMMARY OF THE INVENTION

The general purpose of the present invention is to provide a robotic load device for outer diameter pickup of a disk.

The manufacture of magnetic storage disks of the type used in direct access storage devices (DASDs) has become highly automated. Automation has been increasingly used both to reduce the manufacturing costs and to improve the yield of the disk manufacturing process. As recording densities increase, the thickness of the magnetic recording media is necessarily reduced, making it necessary to eliminate smaller and smaller particles (contaminants) from the surface in order to maintain an error-free surface. To this end, special manufacturing environments, such as clean rooms have been provided. These rooms are provided with extensive air filtration and circulating systems to reduce the number of particles which are present during the critical stages of disk manufacture. Inevitably, the manufacturing process itself has generated contaminants so that even if a room is satisfactorily free of particles at the outset, particles generated by the process itself soon contaminate the room before they are filtered out. Since the particles are continuously generated within the room, they have the potential to contaminate the disk before they are carried out of the clean room.

In the present invention, the generation of contaminating particles is reduced to a negligible amount by elimination of any sliding or rubbing or frictional engagement. In addition, the existence of a vacuum, and resulting air flow from the system at the precise point where particles might be generated, serves to scavenge any particles before they can contaminate the clean room.

According to one embodiment of the present invention, there is provided a robotic device which contacts a disk only in the region of the outer rim and retains the disk in engagement with the device by a vacuum loaded slot in which the vacuum serves both to retain the disk and to scavenge any contaminants. Since only the outer rim of the disk is in contact with the device, there is no sliding or rubbing contact with the surface of the disk, thereby avoiding the generation of contaminants.

Significant aspects and features of the present invention include no surface contact of a disk; simplicity with no moving components; an ability to randomly select disks at any spacings; and independently changeable grippers for output or input.

One object of the present invention is to provide a robotic load device for outer diameter pickup, which allows for pickup from any known container, and can be used to provide random sample pickup.

Another object of the present invention is to provide a robotic load device for pickup of a disk by the outer diameter for placement on a processing spindle.

Other advantages of the present invention is to provide that there is no surface contact between the robotic load device for outer diameter pickup and the surfaces of disk, no moving parts, an ability to randomly select disks at predetermined spacing, and independently changeable robotic load devices for input spindles or output spindles.

Additional advantages of the present invention include under water pickup, multiple disk pickup, pickup of disk drive final assembly or pickup of any curved surface element, such as wafers, optical disks, compact disks or any flat surface element.

DESCRIPTION OF THE INVENTION—DETAILED DESCRIPTION OF THE PREFERRED EMBODIMENTS

Figure 1:
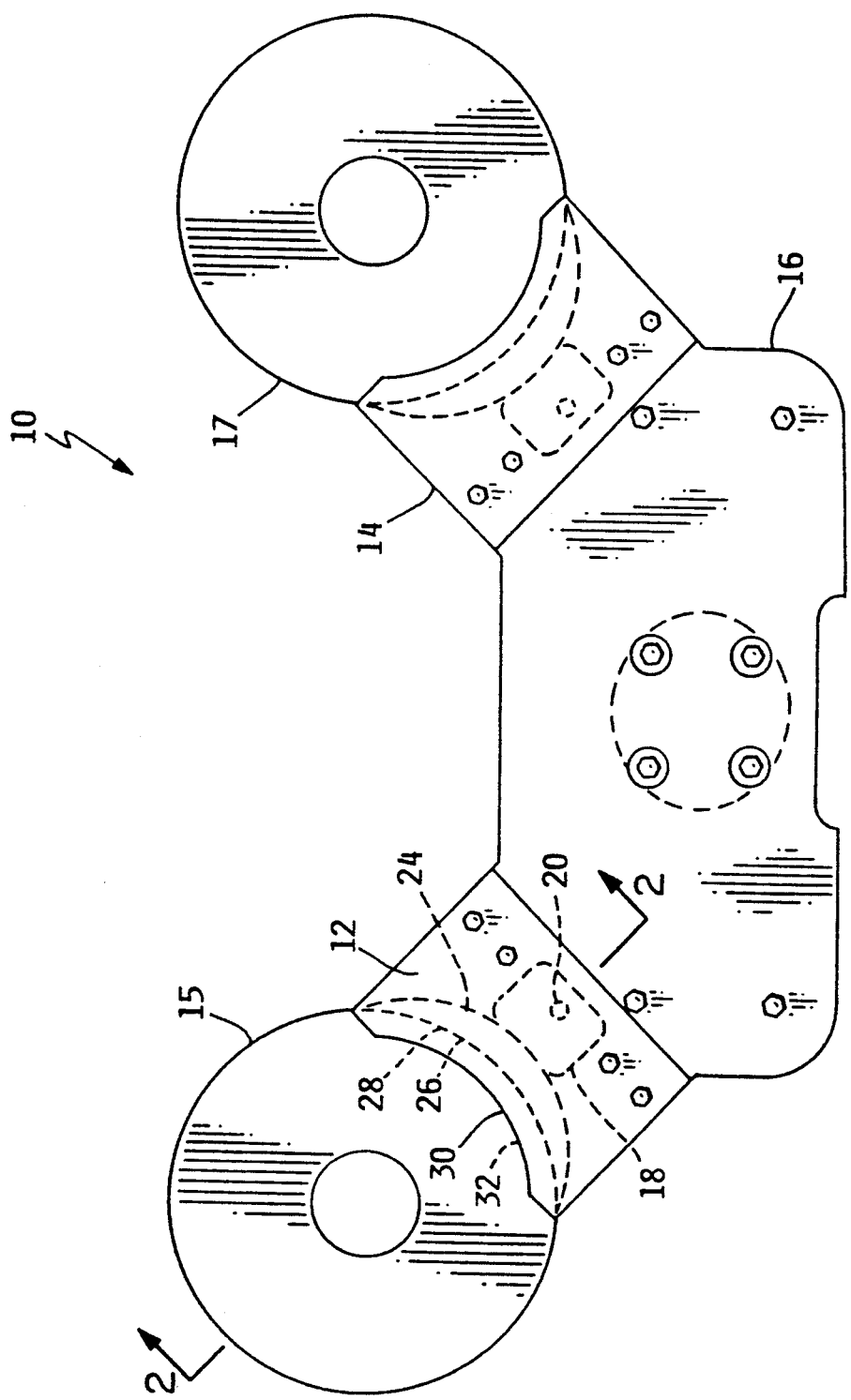
FIG. 1 illustrates a plan view of robotic load devices for outer diameter pickup of disk on a base.

FIG. 1 illustrates a plan view of a robotic load device 10 having identical and opposed gripper members 12 and 14 secured to a robotic flange 16. The gripper members 12 and 14 are identical in construction and only one is described for purposes of brevity and clarity. One of the gripper members can be used for input and the other for output, or a single gripper member can be utilized.

The disks 15 and 17 are held in the gripper members 12 and 14 by the vacuum forces obtained, holding the disks in place only by using the surface area of the non-champhered outer rim of the disk for engagement. Each of the gripper members 12 and 14 is of a suitable polymer material. The gripper members 12 and 14 are formed of a rectangular member of material with the bottom configured with the appropriate angular sides, a flat surface 15 and a vacuum chamber 18 connecting to a centrally located vacuum engagement slot 24, as now described in detail.

Figure 2:
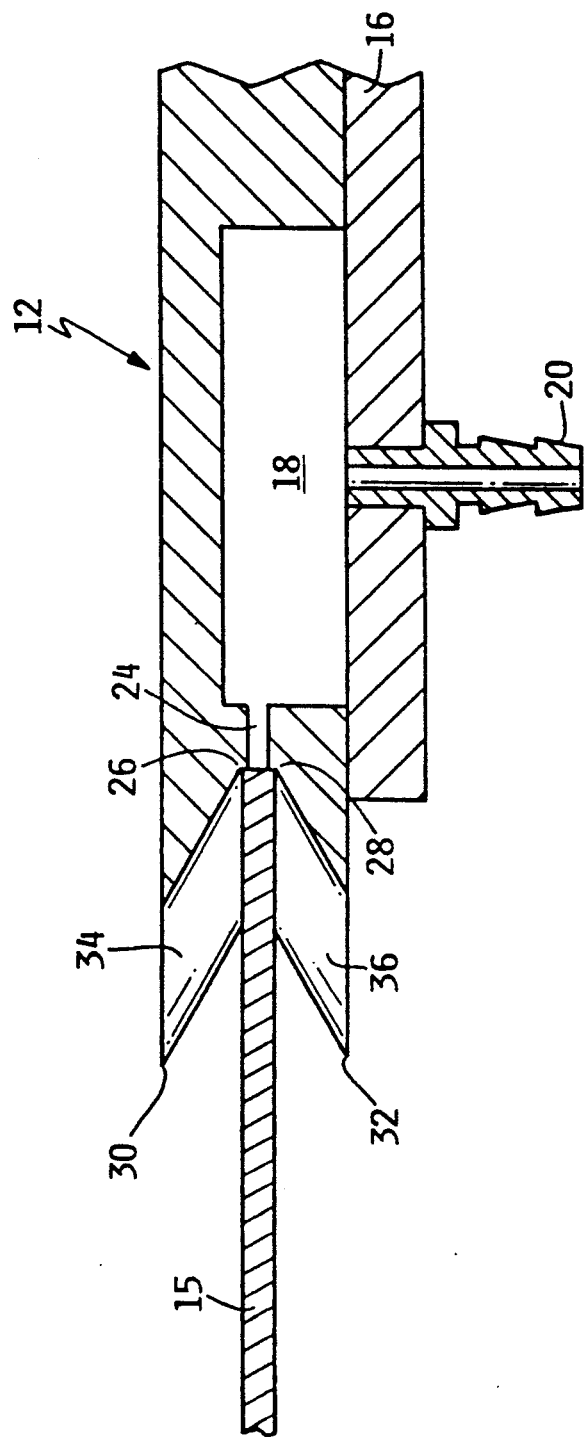
FIG. 2 illustrates a side view along line 2—2 of FIG. 1.

FIG. 2 illustrates a cross-sectional view of the gripper members along line 2—2 of FIG. where all numerals correspond to those elements previously described. Inner curve radii 26 and 28 on opposing sides of the vacuum engagement slot 24 correspond to the radius of a disk 15, while the outer curve radii 30 and 32 are slightly larger. Opposing angular surfaces 34 and 36 are angled, such as 10°, by way of example and for purposes of illustration only and not to be construed as limiting of the present invention, and connect the radii pairs 26, 28, 30 and 32, which provide for guiding and centering of a disk 15 to the angular surfaces 34 and 36, up to a flat 25. The angled surfaces protect the flat of the gripper against nicks or damage. A hose coupling 20 connects to the vacuum chamber 18. The radius of the groove formed by opposing angular surfaces 34 and 36 in the gripper member 12 geometrically matches the disk outer radius, and creates a stable holding surface. Therefore, minimal surface area is held by the vacuum which creates the force necessary to engage the disk held during operations.

Any suitable angle between the angular surfaces 34 and 36 can be utilized so as not to touch the sides of the disk. The vacuum engagement slot 24 is coupled from the flat 25 to the vacuum chamber 18 to a hose coupling 20 for connection to a vacuum line not illustrated for purposes of brevity in the drawings. The vacuum force engages the surface area of the non-chamfered edge of the disk because of the vacuum being pulled through the slot, which creates the force necessary to retain the edge of the disk between the angular surfaces 34 and 36 of the gripper member 12. The flat 25 creates a minimal surface area, while also providing a stable holding surface.

Mode of Operation

The robotic load device is used for picking up of disks, such as those used in direct-access-storage devices "DASD". The device can either be used singularly or ganged in two or more for picking up more than one disk at one time.

The robotic load devices with the vacuum acts as a vacuum chamber while the slots distribute the vacuum to the edge of the disk. The groove formed in the gripper member is characteristically dimensioned to eliminate the possibility of the disk surfaces being touched. The disk is held by the vacuum forces against flat 25, holding the device in place only by using the surface area of the non-champhered edge of the disk. The groove formed in the gripper member is of the characteristics dimensionally illustrated to eliminate the possibility of the disk surface being touched by the angular sides between slotted flat surface.

Any suitable sized disk, substrate, or other cylindrical object of a curved surface having an edge similar to a disk or any object having two surfaces a flat edge to apply the vacuum on can be engaged by the robotic load device, which is physically dimensioned for the disk or substrate. The surface only must be configured to engage to the surface of the robotic load device. Curved surfaces would include structures selected from the group of wafers, substrates, CDs or optical disks. Also, the robotic load devices can be ganged together for engaging multiple structures, such as for placing one or more disks on a spindle.

Figure 3:
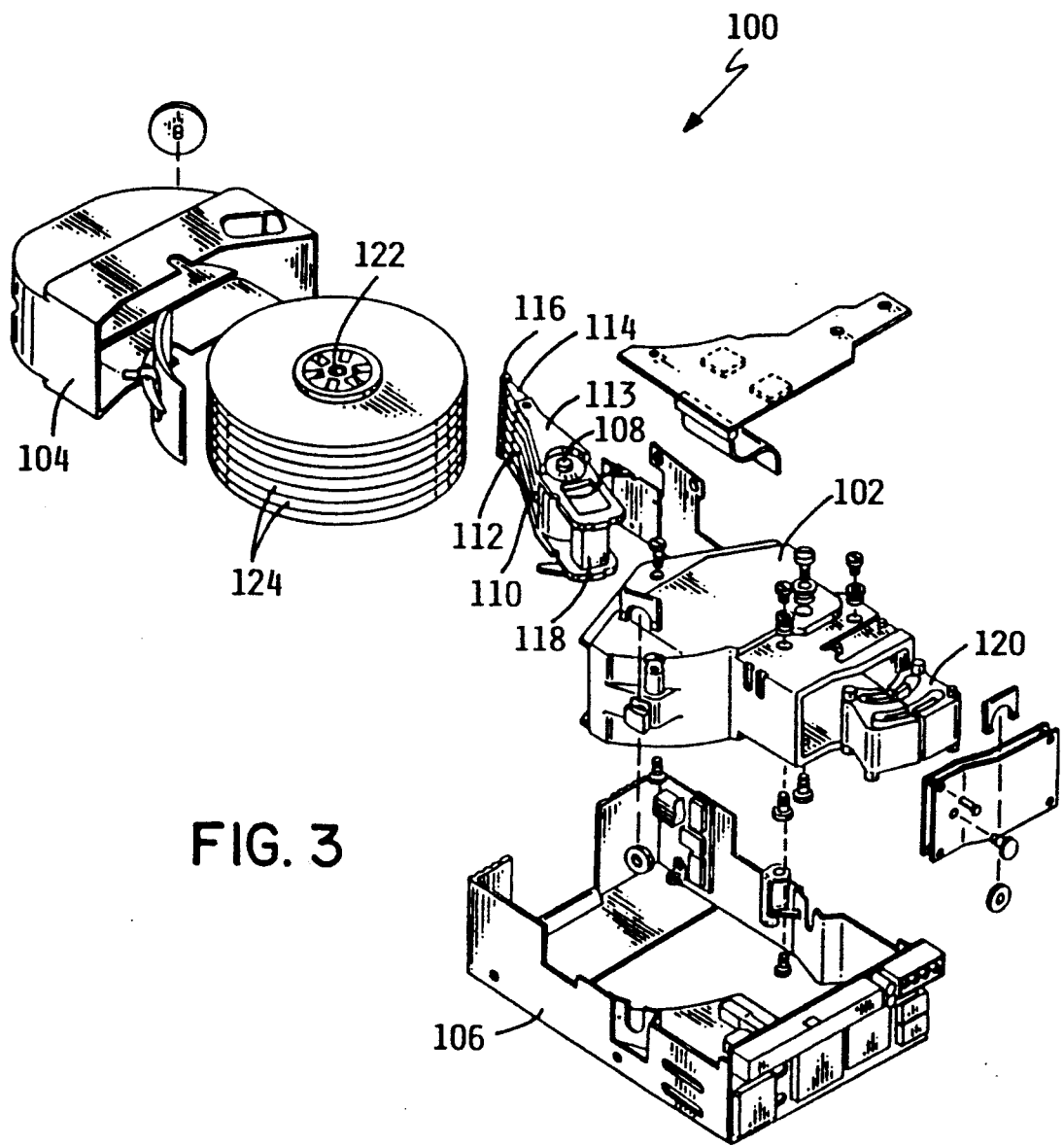
FIG. 3 illustrates an exploded view of a disk drive.

One such application in the manufacture of disk drives. The invention described in this patent application is useful with all mechanical configurations of disk drives or direct access storage devices ("DASD"). FIG. 3 is an exploded view of such a disk drive 100. The disk drive 100 includes a housing 102, a housing cover 104 which, after assembly, is mounted within a frame 106. Rotatably attached within the housing 102 on an actuator shaft 108 is an actuator arm assembly 110. One end of the actuator arm assembly 110 includes an E block, or comb like structure 112 having a plurality of arms 113. Attached to the separate arms 113 on the comb or E block 112, are load springs 114. Attached to the end of each load spring is a slider 116, which carries a pair of magnetic transducers, which could be a read element and write element. On the other end of the actuator arm assembly 110 opposite the load spring 114 and the sliders 116 is a voice coil 118.

Attached within the housing 102 is a pair of magnets 120. The pair of magnets 120 and the voice coil 118 are key parts of a voice coil motor which applies a force to the actuator arm assembly 110 to rotate it about the actuator shaft 108. Also mounted within the housing 102 is a spindle shaft 122. Rotatably attached to the spindle shaft 122 are a number of disks 124. In FIG. 3, eight disks are attached to the spindle shaft 122. As shown in FIG. 3, the disks 124 are attached to the spindle shaft 122 in spaced apart relation. An internal motor (not illustrated) rotates the disks 124.

We claim:

1. A method for engaging a disk comprising the steps of:
  a. providing a member with a radial flat surface for engaging an outer rim of a disk;
  b. providing a slot through a partial portion of said radial flat;
  c. creating a vacuum through said radial flat; and
  d. engaging said radial flat against said outer rim of said disk for movement of said disk, from a first point to a second point.

2. A method for engaging a plurality of disks for a disk drive comprising the steps of:
  a. providing members with a radial flat surfaces for engaging outer rims of disks;
  b. providing slots through a partial portion of said radial flats;
  c. creating a vacuum through said radial flats; and,
  d. engaging said radial flats against said outer rims of said disks for movement of said disks, from a first point to a second point.

3. The method of claim 2 wherein said second point is a spindle shaft for forming a disk drive.

* * * * *